United States Patent [19]
Kurozu et al.

[11] Patent Number: 5,157,389
[45] Date of Patent: Oct. 20, 1992

[54] KEYLESS VEHICLE LOCK SYSTEM

[75] Inventors: Tomotaka Kurozu, Atsugi; Mikio Takeuchi, Zama, both of Japan

[73] Assignee: Nissan Motor Co., Ltd., Japan

[21] Appl. No.: 606,277

[22] Filed: Oct. 31, 1990

[30] Foreign Application Priority Data

Nov. 2, 1989 [JP] Japan .................................. 1-284946
Nov. 2, 1989 [JP] Japan .................................. 1-284947

[51] Int. Cl.⁵ ...................... G08C 19/00; B60R 25/10; G01S 11/02
[52] U.S. Cl. ........................... 340/825.31; 340/825.32; 340/540; 307/10.2; 342/118
[58] Field of Search .................... 340/825.32, 933, 540, 340/825.31, 554; 342/118; 307/10.1, 10.2, 10.3, 10.5, 10.6

[56] References Cited

U.S. PATENT DOCUMENTS

| | | | |
|---|---|---|---|
| 3,725,939 | 4/1973 | Saltzstein | 340/825.77 |
| 4,205,325 | 5/1980 | Haygood et al. | 340/825.32 |
| 4,353,064 | 10/1982 | Stamm | 340/825.32 |
| 4,428,024 | 1/1984 | Mochida | 340/825.32 |
| 4,488,056 | 12/1984 | Mochida | 340/825.32 |
| 4,672,375 | 6/1987 | Mochida et al. | 307/105 |
| 4,674,073 | 6/1987 | Naruse . | |
| 4,719,460 | 1/1988 | Takeuchi et al. | 307/10.2 |
| 4,761,645 | 8/1988 | Mochida | 340/825.32 |
| 4,763,121 | 8/1988 | Tomoda et al. . | |
| 4,827,744 | 5/1989 | Namazue et al. . | |

FOREIGN PATENT DOCUMENTS

| | | | |
|---|---|---|---|
| 3805439 | 9/1989 | Fed. Rep. of Germany | 307/10.2 |
| 2589930 | 5/1987 | France . | |
| 63-1765 | 6/1988 | Japan . | |
| 63-4182 | 9/1988 | Japan . | |

Primary Examiner—Donald J. Yusko
Assistant Examiner—John Giust
Attorney, Agent, or Firm—Lowe, Price, LeBlanc & Becker

[57] ABSTRACT

A keyless lock system for a vehicle includes a card for transmitting a radio signal, at least one onboard antenna for receiving the radio signal, and a control unit for allowing and preventing keyless lock and unlock operations in dependence on the existence or nonexistence of the card in a predetermined area near the antenna. The control unit monitors the position of at least one monitored door, and produces a card warning signal each time the monitored door is closed if the card is absent in the vehicle.

22 Claims, 11 Drawing Sheets

| V C SW / VEHICLE STATE | DOOR LOCK CONTROL | | STEERING LOCK CONTROL |
|---|---|---|---|
| | LOCKED | UNLOCKED | — |
| ACC ON | UNLOCK ONLY WHEN CARD IS IN OUTSIDE AREA | INOPERATIVE | UNLOCK ONLY WHEN CARD IS IN INSIDE AREA |
| ACC OFF | UNLOCK ONLY WHEN CARD IS IN OUTSIDE AREA | LOCK ONLY WHEN CARD IS IN OUTSIDE AREA | UNLOCK ONLY WHEN CARD IS IN INSIDE AREA |

KEYLESS VEHICLE LOCK SYSTEM

BACKGROUND OF THE INVENTION

The present invention relates to a vehicle keyless lock system for controlling one or more door locks and/or a vehicle control lock such as a steering lock without using any key.

Japanese Patent Provisional (KOKAI) Publications Nos. 63-1765 and 63-4182 disclose vehicle keyless lock o systems which enable the driver of a vehicle to unlock a vehicle door or a steering system merely by pushing a request switch if the driver carries a card for radiating radio waves, on the person.

SUMMARY OF THE INVENTION

It is an object of the present invention to provide a keyless vehicle lock system which can avoid troubles due to keyless operations, and improve the vehicle's safety.

It is another object of the present invention to provide a keyless vehicle lock system which is speedy, accurate and resistant to noise in determining the position of an entry card for radiating radio waves.

According to the present invention, a keyless lock system for a vehicle comprises a portable communicating means, an onboard communicating means, a primary (detecting) means, a final (controlling) means, and a (main) controlling means.

The portable communicating means (such as an entry card) transmits a cipher code signal, and the onboard communicating means (such as an antenna connected with a circuitry) receives the code signal. The primary means senses the position of at least one monitored door of the vehicle to determine whether the monitored door is in a closed state or in an open state. The final means produces a first (card) warning signal in response to a first alarm command signal of the controlling means. The controlling means produces an automatic request signal when the door is moved between the open state and the closed state, ascertains the existence of the portable means by receiving the code signal through the onboard communicating means when the automatic request signal is produced, and produces the alarm command signal to command the final means to produce the warning signal if the portable communicating means is absent. Therefore, this keyless lock system can prevent the loss of the portable communicating means by producing the warning signal when the door is operated. Especially, the control system can prevent the portable communicating means from being carried away by a passenger.

According to another aspect of the present invention, a keyless lock system for a vehicle comprises a portable communicating means for transmitting microwaves, an onboard communicating means for receiving microwaves from the portable communicating means, an actuating means for actuating at least one lock unit of the vehicle in response to an actuation command signal, and a controlling means for calculating a distance between the portable communicating means and the onboard communicating means by using a microwave propagation time (or propagation delay), determining, in dependence on the calculated distance, whether the portable communicating means is in a predetermined area or not, and producing the actuation command signal to actuate the lock unit only when the portable communicating means is in the predetermined area. Therefore, this keyless lock system can locate the portable communicating means accurately and speedily without being readily influenced by elecromagnetic noise waves and metallic obstructions.

DETAILED DESCRIPTION OF THE INVENTION

Figure 1:
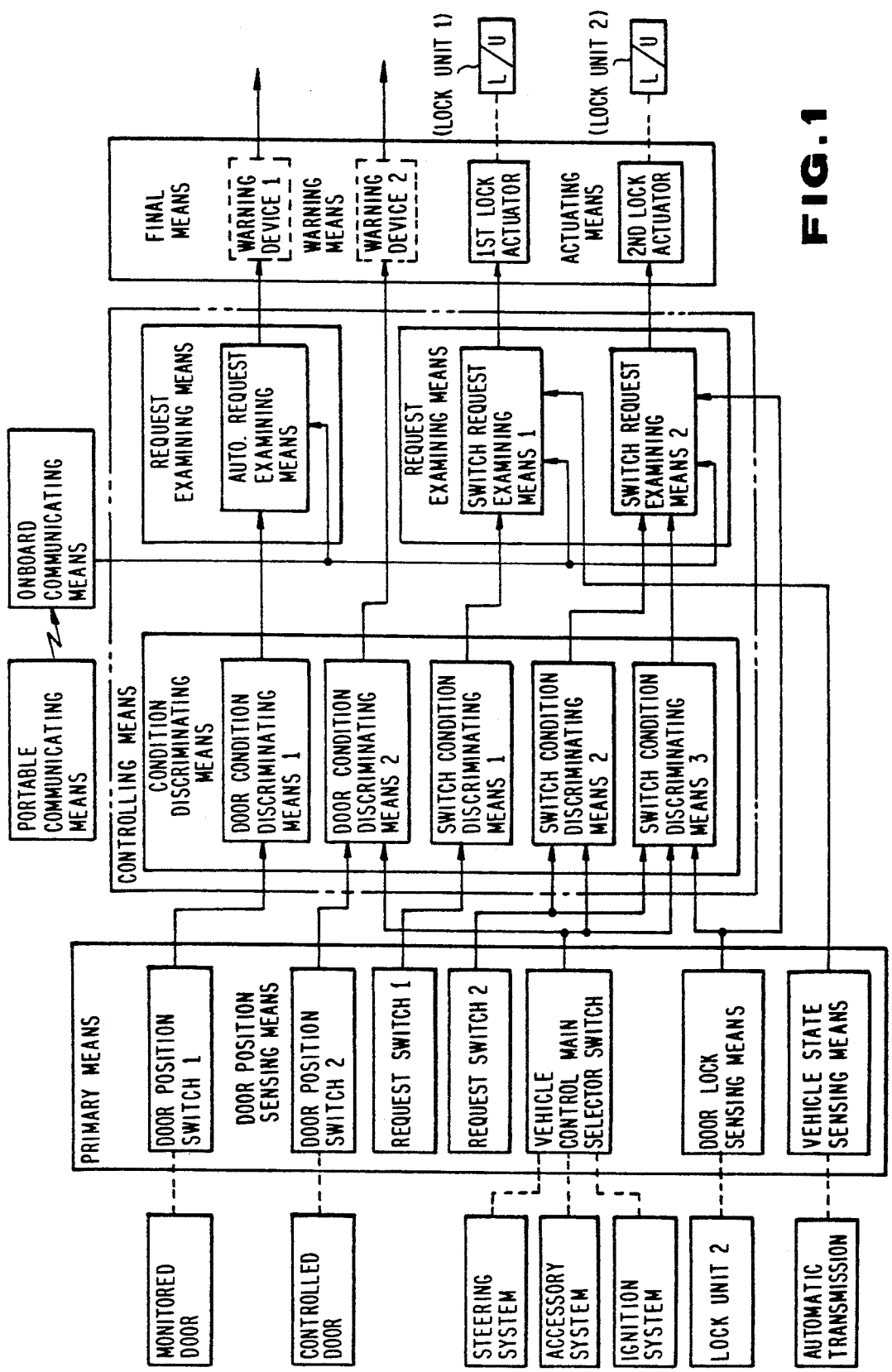
FIG. 1 is a block diagram for schematically showing a keyless lock control system according to a first embodiment of the invention.

FIG. 1 shows an arrangement of various functional means used in the first embodiment. The arrangement shown in FIG. 1 approximately corresponds to the invention claimed in original Claim 13.

As shown in FIG. 1, the keyless lock control system of the first embodiment comprises a portable communicating means PCM, an onboard communicating means OCM, a primary (detecting) means PM, a final (controlling) means FM, and a controlling means CM. The portable communicating means PCM comprises a pocket device which is an entry card in this embodiment, and the onboard communicating means OCM comprises one or more antennas. Both communicating means are designed to perform radio communication. The primary means PM comprises various switches and sensors. The final means FM comprises a warning means WM for producing a warning signal to the driver, and an actuating means AM for actuating one or more lock units of the vehicle. The controlling means CM receives signals from the primary means PM and controls the final means FM by sending one or more command signals in accordance with the input signals sent from the primary means PM. The controlling means CM of this embodiment comprises a condition discriminating means DM for receiving the signals from the primary means PM, and produces at least one request signal, and a request examining means EM which receives the request signal, determines whether the portable means is present in a predetermined area or not, and produces the command signal in dependence on the result of the determination.

In this embodiment, the primary means PM comprises a door position sensing means DPSM which comprises a first door position switch DPSW1 for detecting the position of a monitored door MD of the vehicle and a second door position switch DPSW2 for detecting the position of a controlled door CD of the vehicle. The primary means PM further comprises first and second request switch RSW1 and RSW2, and a vehicle control main selector switch VCSW which is connected with a steering system SS, an accessory system AS and an ignition system IG of the vehicle. The primary means PM further comprises a door lock sensing means DLSM and a vehicle state sensing means VSSM connected with an automatic transmission AT of the vehicle.

In the final means FM of this embodiment, the warning means WM may comprises a first warning device WD1 for producing a first warning signal and a second warning device WD2 for producing a second warning signal, and the actuating means AM comprises a first lock actuator LA1 for actuating a first lock unit LU1 and a second lock actuator LA2 for actuating a second lock unit LU2.

In the controlling means CM, the discriminating means DM comprises first and second door condition discriminating means DDM1 and DDM2; and first, second and third switch condition discriminating means SDM1, SDM2 and SDM3. The examinining means EM comprises an automatic request examining means AREM; and first and second switch request examining means SREM1 and SREM2.

Figure 2:
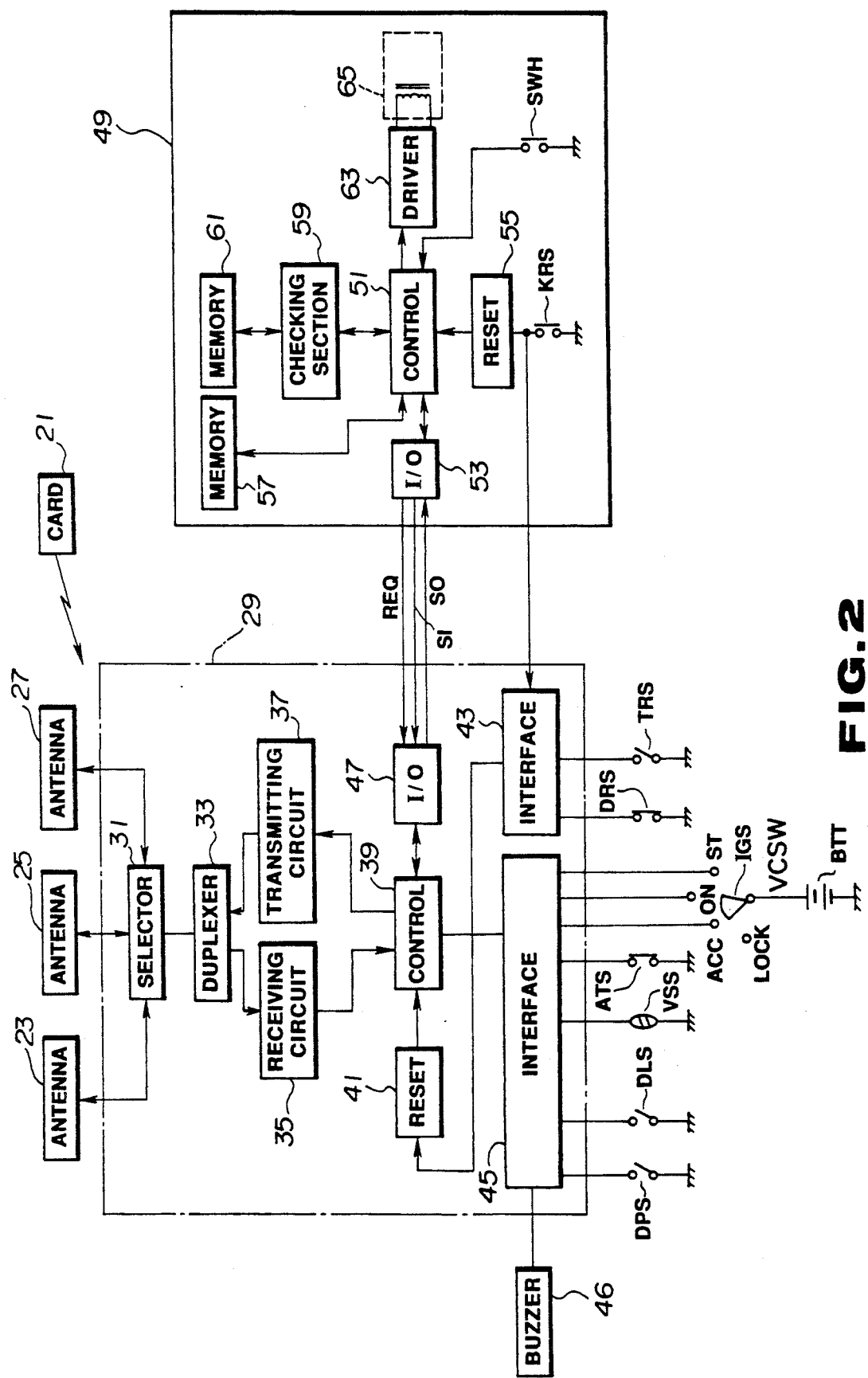
FIG. 2 is a block diagram showing a control unit of the first embodiment.

In this embodiment, the pocket device of the portable communicating means PCM is an entry card 21, as shown in FIG. 2. The card 21 can transmit a predetermined cipher code signal.

As shown in FIG. 2, the onboard communicating means OCM comprises a door control antenna 23, a trunk control antenna 25 and an ignition control antenna 27 which are all mounted on the vehicle. The door antenna 23 is mounted on a front door on the driver seat's side near the outside handle. The door antenna 23 can receive the code signal when the driver stands near the driver door with the card 21. It is optional to provide another antenna on the other front door. The trunk antenna 25 is a built-in antenna located inside a rear bumper of the vehicle. The trunk antenna 25 can receive the code signal when the driver stands with the card 21 near a trunk lid of the vehicle. The ignition control antenna 27 is located outside a steering lock unit near the driver's seat.

A control unit 29 is connected with each of the antennas 23, 25 and 27. The control unit 29 includes an antenna selector circuit 31 for selectively making conneciton to any one of the antennas 23, 25 and 27, a duplexer circuit 33, a receiving (receiver) circuit 35, a transmitting (transmitter) circuit 37, and a control section 39. The duplexer circuit 33 connects the receiving circuit 35 with the selector 31 during a receiving period, and connects the transmitting circuit 37 with the selector 31 during a transmitting period. The control section 39 includes a central processing unit of a microcomputer, and serves as the controlling means CM. The control section 39 receives the code signal from the card 21 through one of the antennas 23, 25 and 27, and sends the code signal through an input and output circuit 47 to a steering lock unit 49. The control section 39 is connected through a reset circuit 41 with an interface circuit 43. The control section 39 is further connected through an interface circuit 45 with a buzzer 46 serving as the warning means WM, and various switches of the primary means PM.

The peripheral devices connected with the interface circuit 45 are at least one door position switch DPS, at least one door lock switch DLS, a vehicle speed sensor VSS, an automatic transmission position switch ATS, and a vehicle control main selector switch VCSW including an ignition switch IGS which is connected with a battery BTT. In this embodiment, there are provided a plurality of door position switches DPS for sensing the positions of all the doors of the vehicle. The door position switches are connected in parallel to each other between a ground and the interface circuit 45. On the other hand, the interface circuit 43 is connected with at least one door request switch DRS and a trunk request switch TRS provided in the trunk lid of the vehicle. In this embodiment, the door request switch DRS is located on the driver's front door near the outside door handle. It is optional to provide another door request switch in the other front door.

The steering lock unit 49 has a control section 51 which includes a central processing unit of a microcomputer. The control section 51 receives the cipher code signal and other information from the control unit 29 through an input and output circuit 53, and performs various control operations to lock and unlock the steering system of the vehicle. The control section 51 is connected through a reset circuit 55 with a key request switch KRS. The key request switch KRS is further connected through the interface circuit 43 with the reset circuit 41. When the key request switch KRS is switched on, then the reset circuit 55 resets the control section 51 to a prescribed state, and at the same time the reset circuit 41 resets the control section 39 to a prescribed state. The control section 51 is further connected with a memory section 57 which stores request codes for requesting various information items from the control unit 29.

The steering lock unit 49 further includes a checking section 59 which is connected with the control section 51, and a memory section 61 for storing cipher code data. The checking section 59 collates the cipher code signal sent from the card 21 through the control unit 29, with the cipher code data stored in the memory section 61. If the cipher code signal of the card 21 is in complete agreement with the code data of the memory section 61, then the checking section 59 sends an agreement signal to the control section 51. A driver circuit 63 is connected with the control section 51 and a latch solenoid 65. The control section 51 actuates the latch solenoid 65 through the driver circuit 63 in accordance with the agreement signal of the checking section 59. A switch SWH is put in a closed state only when the selector switch is in an ACC position or a spare key is inserted in a key hole formed in the steering lock unit.

The steering lock unit 49 further includes a steering locking means for locking the steering system of the vehicle, a steering unlocking means for unlocking the steering system, and an inhibiting means for preventing the unlocking operation of the steering unlocking means. (These means are not shown in the figures.) The driver circuit 63 and the latch solenoid 65 serve as a releasing means for cancelling the inhibition of the inhibiting means. When the agreement signal is produced by the checking section 59, the control section 51 actuates the latch solenoid 65 to cancel the inhibition of the inhibiting means.

Figure 3A:
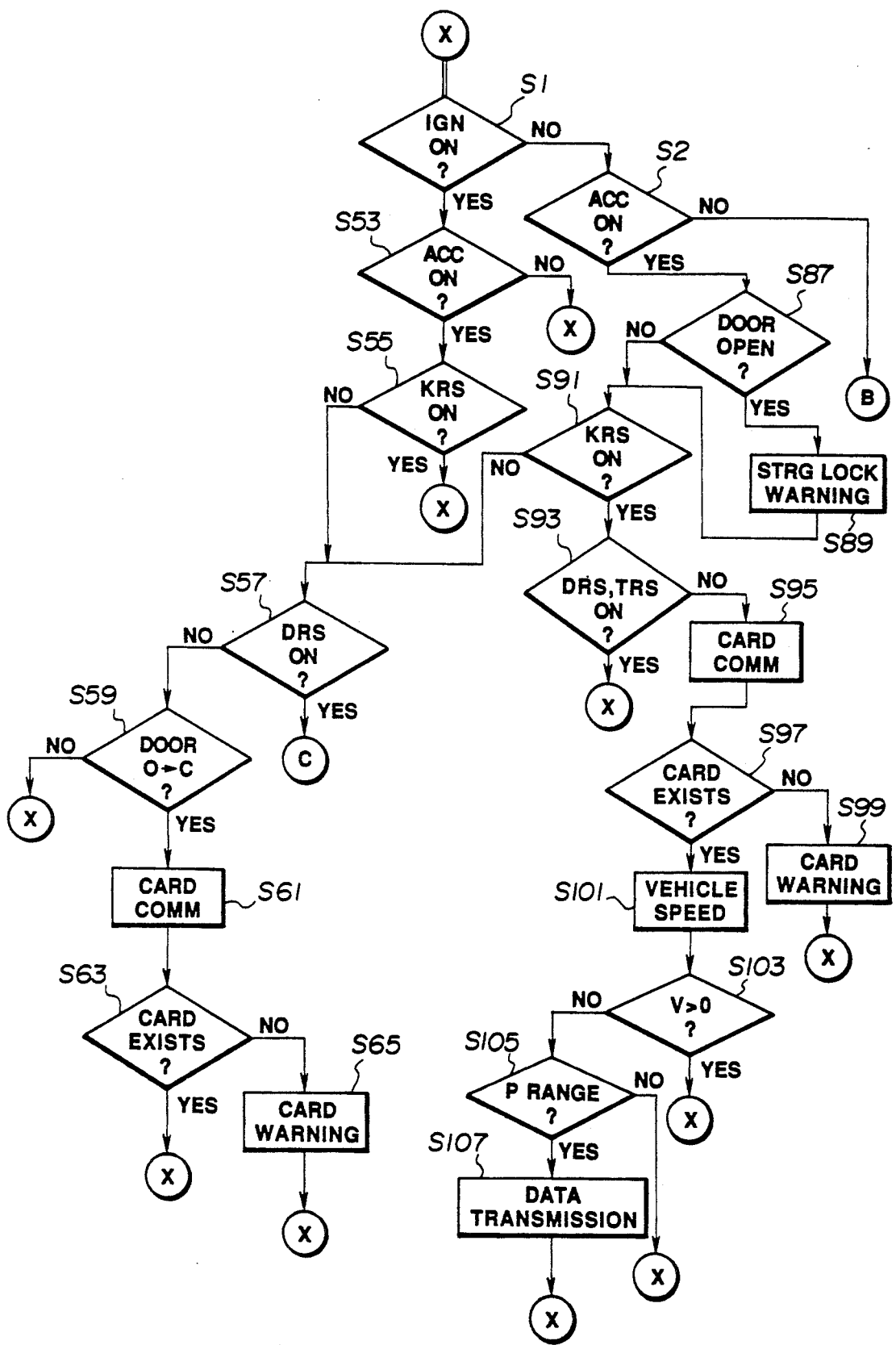
FIGS. 3A, 3B and 3C are flowcharts showing a control procedure performed by the keyless lock control system of the first embodiment.
Figure 3B:
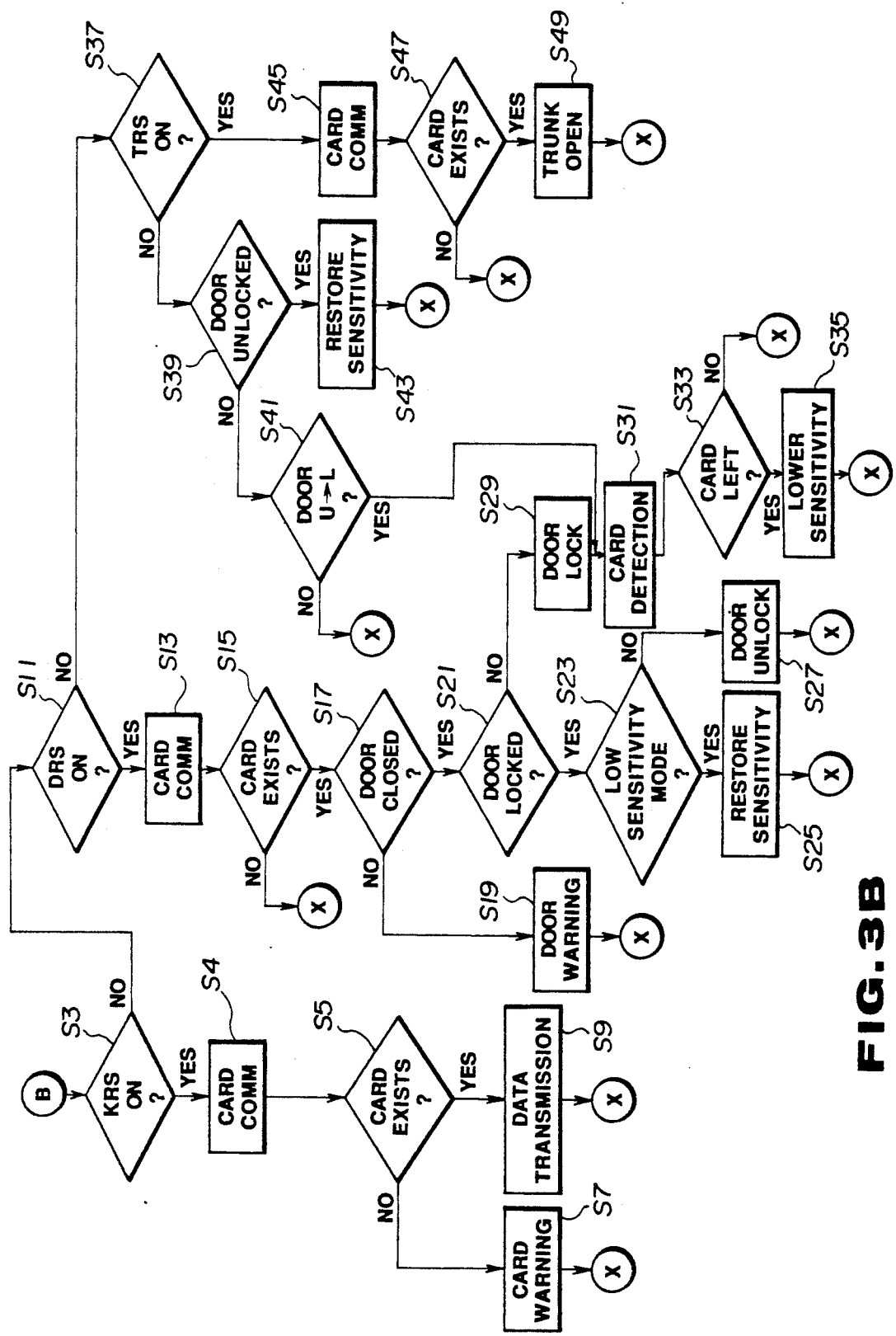
Figure 3C:
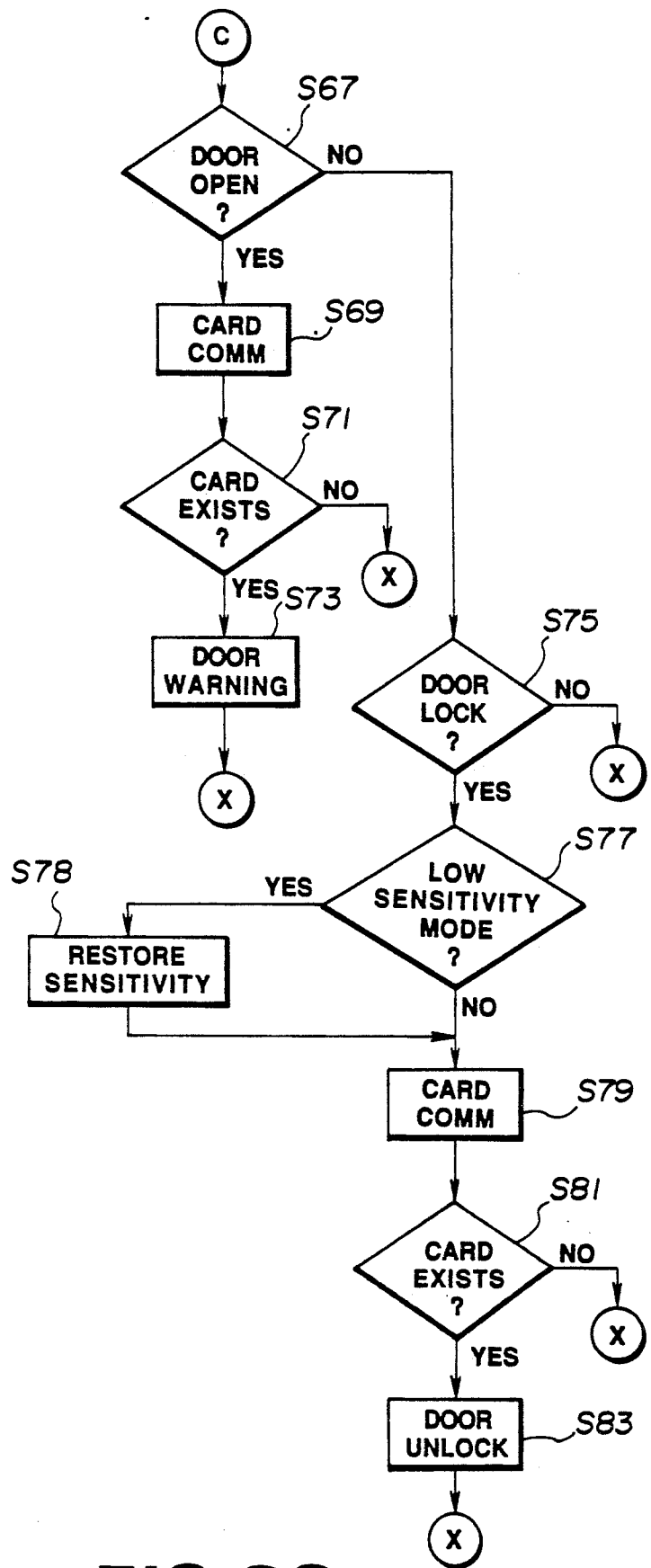

The keyless lock control system of the first embodiment is operated as shown in FIGS. 3A, 3B and 3C.

(A) The driver can enter the vehicle as follows:

At a step S1 shown in FIG. 3A, (the controlling means of) the keyless lock control system determines wether the ignition switch IGS is in the on state or not. If it is not, the control system proceeds to a step S2 to determine whether the vehicle control main selector switch VCSW is in the ACC position for turning on the electric accessory system of the vehicle. If the answer of the decision step S2 is negative, then the control system proceeds to a step S3 shown in FIG. 3B through a connector point B. At the step S3, the control system determines whether the key request switch KRS is in the on state or not. If the key request switch KRS is in the off state, then the control system determines at a step S11 whether the door request switch DRS is in the on state or not. When the driver pushes the door request switch DRS (to a request position), the door request switch DRS is turned on, and the control system proceeds to a step S13.

At the step S13, the control unit 29 carries out communication with the card 21 which is held by the driver standing near the driver's door. The control unit 29 transmits an interrogation signal from the door antenna 23 to the card 21 when the door request switch DRS is switched on, and the card 21 transmits the code signal automaticaly when the card 21 receives the correct interrogation signal. At a step S15, the control system compares the code signal of the card 21 with the stored code data to note points of disagreement, and determines whether the correct card 21 exists in a predetermined door operating area. For example, the door operating area is an area near the outside handle of the driver's door. If the card 21 is absent in the predetermined door operating area, then the control system returns from the step S15 to the step S1 through a connector point X. If the correct card 21 is detected in the door operating area, then the control system proceeds to a step S17 to determine whether the doors are in the closed state or not. If at least one door is not in the closed state, then the control system produces, at a step S19, a door warning signal to warn the driver that the doors are not closed securely. From the step S19, the control system returns to the step S1 through the connector point X. When the answer of the step S17 is affirmative, then the control system proceeds to a step S21 to determine whether the driver's door is in the locked state or not. If the door is in the locked state, then the control system proceeds to a step S23 to determine whether the control system is in a low sensitivity mode or not. If it is, the control system proceeds to a step S25 to restore the sentivity to a normal level, and perform a predetermined check operation; and then returns to the step S1 through the connector point X. If the control system is not in the low sensitivity mode but in a normal mode, then the control system proceeds from the step S23 to a step S27. At the step S27, the control system delivers a door unlock command signal to the door lock actuator, and by so doing unlocks the driver's door. Then, the control system returns from the step S27 to the step S1 through the connector point X. In this way, the driver having the card 21 can open the driver's door and enter the vehicle.

The door request switch DRS corresponds to the second request switch RSW2 shown in FIG. 1; the step S11 corresponds to the second switch condition discriminating means SDM2; and the steps S13, S15, S21 and S27 correspond to the second switch request examining means SREM2. The door lock switch DLS serves as the door lock sensing means DLSM.

(B) The keyless lock control system of the first embodiment enables the driver to start the engine as follows:

When the vehicle main selector switch VCSW is not turned to the accessory (ACC) position, and the ignition switch is still in the off state, the control system reaches the step S3 through the steps S1 and S2 and the connector point B. When the driver pushes the key request switch KRS, then the key request switch KRS is turned on, and remains on until released. Therefore, the control system proceeds from the step S3 to a step S4. At the step S4, the control system sends the interrogation signal to the card 21 and receives the cipher code signal from the card 21. At a step S5, the control system determines whether the card 21 exists in a predetermined key operating area, which is, for example, an area located at and near the driver's seat. If the card 21 is nonexisting in the key operating area, then the control system actuates the buzzer 46 at a step S7 to warn the driver with a buzzing sound that the card 21 is missing. After the step S7, the control system returns to the step S1. If the card 21 exists in the key operating area, then the control system proceeds from the step S5 to a step S9. At the step S9, the control unit 29 transmits the cipher code signal received from the card 21, a request code for requesting the collation of the checking section 59 and other information, to the steering lock unit 49. In the steering lock unit 49, therefore, the checking section 59 checks the code signal of the card 21 to ascertain that the code signal is in complete agreement with the stored code. If the agreement is confirmed, the steering lock unit 49 releases a button 49b (shown in FIG. 4) for a limited time duration, and allows the driver to turn the vehicle control selector switch VCSW to start the engine. If the code signal sent from the card 21 is not in complete agreement with the stored code, then the steering lock unit 49 holds the lock button 49b immovable, and the vehicle control switch VCSW inoperable to protect the vehicle against theft.

The key request switch KRS corresponds to the first request switch RSW1 shown in FIG. 1; the step S3 corresponds to the first switch condition discriminating means SDM1; and the steps S4 and S5 corresponds to the first switch request examining means SREM1.

(C) When the vehicle control main switch VCSW is in the ACC position or the ON position (the vehicle unlock state):

When the ignition switch IGS is in the on state for switching on the ignition system, the control system proceeds from the step S1 to a step S53 to determine whether the electric accessory system is in the on state. When the answer of the step S53 is affirmative, the control system checks the state of the key request switch KRS at a step S55. If the key request switch KRS is in the off state, the control system proceeds to a step S57 to check the state of the door request switch DRS.

When the vehicle control main selector switch VCSW is in the ACC position for turning off the ignition switch IGS and turning on the accessory system, the control system reaches a step S87 through the steps S1 and S2. At the step S87, the control system determines whether the driver's door is in the open state or not. If the door is in the closed state, the control system proceeds directly to a step S91 to check the state of the key request switch KRS. When the key request switch KRS is in the off state, the control system proceeds to the step S57.

From the step S57, the control system proceeds to a step S59 if the door request switch DRS is in the off state. At the step S59, the control system determines whether a monitored door of the vehicle is moved from the open state to the closed state. In this example, the answer of the step S59 becomes affirmative when the monitored door is in the closed state in the current execution of the step S59 although the monitored door was in the open state in the last execution of the step S59. It is convenient to use for the step S59 a flag (or condition code) indicating the open and closed states of the monitored door. In this example, the control system monitors the positions of all the doors of the vehicle, and makes an affirmative answer to the step S59 if any one or more of all the doors of the vehicle is moved from the open state to the closed state. The control system returns to the step S1 when the answer of the step S59 is negative, and proceeds to a step S61 when the answer of the step S59 is affirmative. At the step S61, the control unit 29 performs radio communication with the card 21. At a next step S63, the control system determines whether the card 21 exists in a predetermined safe area. For example, the control system determines whether the card 21 exists in the passenger compartment of the vehicle. If the card 21 is absent in the safe area, the control system proceeds from the step S63 to a step S65. At the step S65, the control system actuates the buzzer 46 to produce a card warning signal indicating the absence of the card 21. After the step S65, the control system returns to the step S1. In this way, this control system can prevent the card 21 from being taken away by a passenger, by producing the card warning signal. As shown in FIG. 3A, the step 59 is reached only when at least one of the steps S1 and S2 provides an affirmative answer. When the driver leaves the vehicle, the ignition switch IGS is normally turned off, and, therefore, the control system does not reach the step S65.

The step S59 corresponds to the first door condition discriminating means DDM1, and the steps S61 and S63 correspond to the automatic request examining means AREM.

(D) The control system prevents the driver from leaving the vehicle without locking the steering system.

If the driver opens the driver's door while the vehicle control main selector switch VCSW is in the ACC position, the control system proceeds from the step S2 to a step S87 to determine whether the driver door is in the open state or not. If the door is open, the control system proceeds to a step S89. At the step S89, the control system actuates the buzzer 46 to produce a steering lock warning signal to warn that the steering lock is forgotton. The step S87 may be so designed that the answer of the step S87 is affirmative when either or both of the left and right front doors is in the open state. It is optional to employ a warning device which is used only for the steering lock warning of the step S89. From the step S89 or the step S87, the control system proceeds to a step S91 to determine whether the key request switch KRS is in the on state or not. If the key request switch KRS is in the off state, the control system proceeds to the step S57, at which the control system determines whether the door request switch DRS is in the on state or not. If the door request switch DRS is in the on state, then the control system proceeds to a step S67 shown in FIG. 3C, through a connector point C. At the step S67, the control system determines whether any one or more of the vehicle doors is in the open state If all the doors are in the closed state, then the control system proceeds from the step S67 to a step 75. At the step S75, the control system determines whether the driver's door is in the locked state or not. If the driver's door is not in the locked state, then the control system returns from the step S75 to the step S1 through the connector point X. Therefore, the control system of this embodiment prevents the keyless lock operation when the steering system is not locked, and by so doing makes the driver aware of the steering lock.

If any one or more of the doors is in the open state, the control system proceeds from the step S67 to a step S69 to perform radio communication with the card 21. At a step S71 following the step S69, the control system determines whether the card 21 exists in the predetermined door operating area. If the card 21 exists in the door operating area, then the control system produces a door warning signal at a step S73 to warn that at least one door is not securely closed.

If the driver's door is locked, and accordingly the answer of the step S75 is affirmative, then the control system proceeds from the step S75 to a step S77. At the step S77, the control system determines whether the radio receiving mode is in the low sensitivity mode or not. If it is, the control system restores the sensitivity to the normal level at a step S78, and then proceeds to a step S79. If the answer of the step S77 is negative, then the control system proceeds directly to the step S79. The control unit 29 performs radio communication with the card 21 at the step S79, and determines, at a step S81, whether the card 21 exists in the door operating area. If the card 21 is detected in the door operating area, then the control system unlocks the driver's door by producing a door unlock command signal at a step S83.

The step S87 corresponds to the second door condition discriminating means DDM2, and the step S57 corresponds to the third switch condition discriminating means SDM3.

(E) The driver can stop the engine as follows:

The driver can stop the engine by turning the vehicle control main selector switch VCSW from the ON position to the ACC position. In this case, the control system proceeds to the step S87 through the step S2. If the driver's door remains in the closed state, then the control system proceeds to the step S91 to determine whether the key request switch KRS is in the on state. When the key request switch KRS is in the on state, then the control system proceeds from the step S91 to a step S93 to determine whether at least one of the door request switch DRS and the trunk request switch TRS is in the on state. If both of the request switches DRS and TRS are in the off state, the control system proceeds from the step S93 to a step S95 to perform radio communication with the card 21. Then, the control system determines, at a step S97, whether the card 21 exists in the predetermined key operating area which is, for example, an interior area at and near the driver's seat. If the card 21 exists in the key operating area, then the control system determines, at a step S101, the current value of the vehicle speed V of the vehicle sensed by the vehicle speed sensor VSS, and determines, at a step S103 whether the vehicle is in motion or at rest. If the vehicle is moving, then the control system returns to the step S1 through the connector point X. In this way, the control system improves the safety of the vehicle by making it impossible to lock the steering system while the vehicle is moving.

When the vehicle is not moving, the control system proceeds from the step S103 to a step S105 to determine whether the automatic transmission is in the parking range. In this example, it is determined whether the driver's shift lever is in the parking position or not. If the automatic transmission is not in the parking range, then the control system returns to the step S1. In this way, the control system can improve the safety of the vehicle by inhibiting the steering lock while the shift lever is out of the parking position.

If the automatic transmission is in the parking range, the control system proceeds from the step S105 to a step S107. At the step S107, the control unit 29 transmits the cipher code signal of the card 21, the request code for requesting the collation of the checking section 59 and other information, to the steering lock unit 49. Therefore, the steering lock unit 49 releases the button 49b and allows the driver to turn the selector switch VCSW from the ACC position to the LOCK position to lock the steering system if the cipher code signal of the card 21 is in complete agreement with the stored code.

If the card is not detected in the key operating area, then the control system proceeds from the step S97 to a step S99 to actuate the buzzer 46 to warn that the card 21 is missing.

The step S91 corresponds to a first lock request signal producing means of the first switch condition o discriminating means SDM1, and the steps S95, S97, S101, S103 and S105 correspond to a first lock command signal producing means of the first switch request examining means SREM1. On the other hand, the step S3 corresponds to a first unlock request signal producing means of the first switch condition discriminating means SDM1, and the steps S4 and S5 correspond to a first unlock command signal producing means of the first switch request examining means SREM1.

(F) The driver can get off the vehicle as follows:

When the vehicle control main selector switch VCSW is turned to the LOCK position, the control system reaches the step S11 through the steps S1, S2 and S3. When the door request switch DRS is in the on state, the control system proceeds to the step S13. Therefore, the control system performs radio communication with the card 21 at the step S13, determines, at the step S15, whether the card 21 exists in the predetermined door operating area, and determines, at the step S17, whether all the doors are in the closed state. If all the doors are securely closed, then the control system determines, at the step S21, whether the driver's door is in the locked state or not. If the driver door is not locked, then the control system locks all the doors by producing a door lock command signal at a step S29.

Then, the control system detects the position of the card 21 at a step S31, and determines, at a step S33, whether the card 21 is left behind in the passenger compartment. If the card 21 is not in the passenger compartment, then the control system returns from the S33 to the step S1. If the card 21 is forgotten in the passenger compartment, the control system proceeds to a step S35, and changes the radio receiving mode to the low sensitivity mode by lowering the sensitivity to a low level. Therefore, if an unauthorized person pushes the door request switch DRS, the control system prevents the door from being unlocked by preventing radio communication between the control unit 29 and the card 21 left behind in the passenger compartment.

(G) The driver can open the trunk lid as follows:

When the key request switch KRS and the door request switch DRS are both in the off state, then the control system reaches a step S37 through the steps S3 and S11. The control system determines, at the step S37, whether the trunk request switch TRS is in the on state or not, and proceeds to a step S39 if the trunk request switch TRS is in the off state. At the step S39, the control system determines whether at least one door is in the unlocked state. If all the doors are in the locked state, the control system determines, at a step S41, whether at least one door is changed from the unlocked state to the locked state. If at least one door is in the locked state in the current execution of the step S41 although that door was in the unlocked state in the previous execution, then the control system proceeds from the step S41 to the step S31. If the answer of the step S41 is negative, then the control system returns from the step S41 to the step S1. If at least one door is in the unlocked state, then the control system proceeds from the step S39 to a step S43 to restore the sensitivity of the control unit 29. From the step S43, the control system returns to the step S1.

When the trunk request switch TRS is in the on state, the control system proceeds from the step S37 to a step S45, at which the control unit 29 performs radio communication with the card 21. Then, the control system determines, at a step S47, whether the card 21 exists in a predetermined trunk operating area near the trunk lid of the vehicle. If the card 21 is missing, then the control system directly returns to the step S1. If the card 21 is present in the trunk operating area, then the control system opens the trunk lid by producing a trunk open command signal at a step S49. From the step S49, the control system returns to the step S1.

Figure 4:
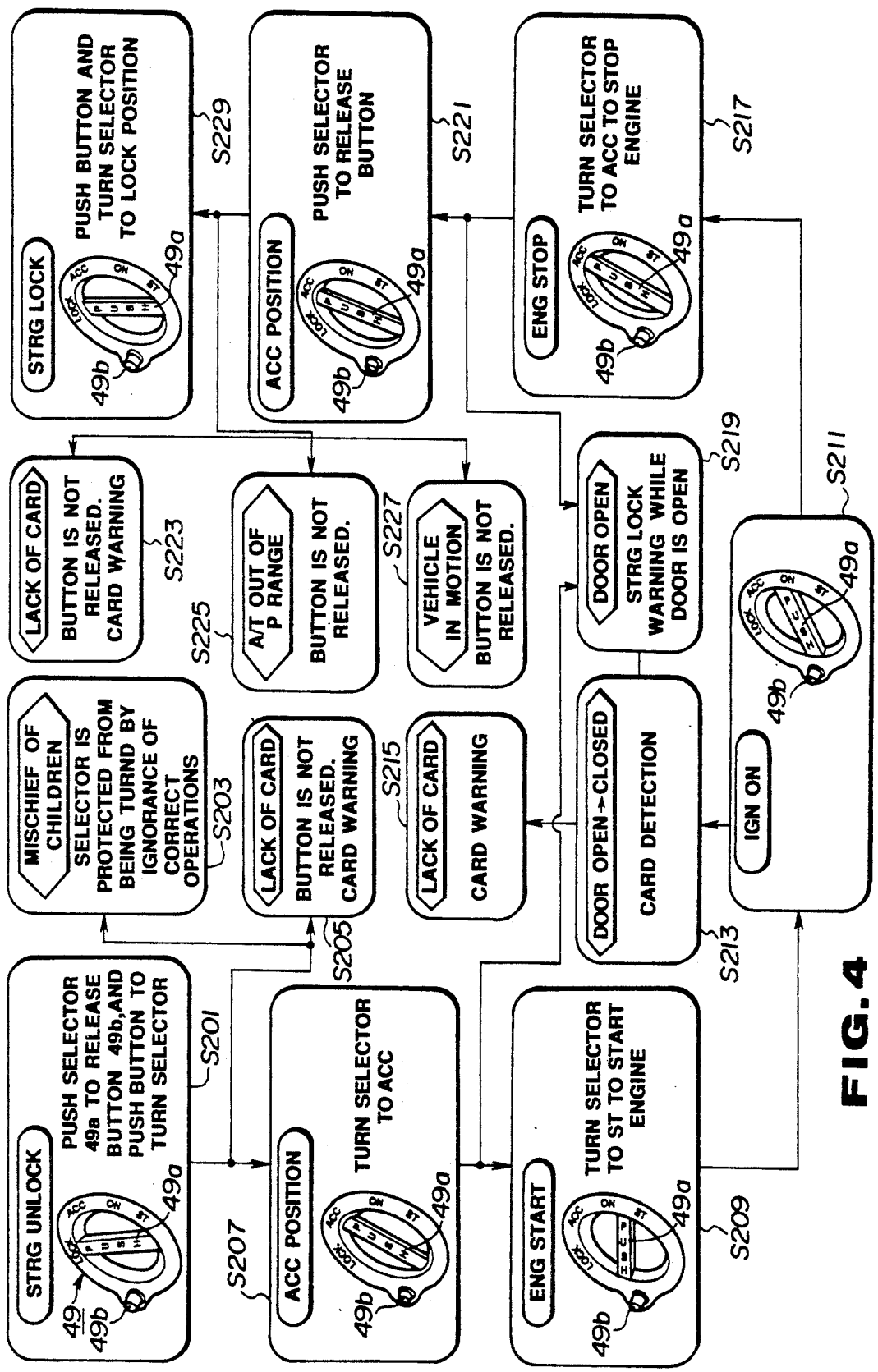
FIG. 4 is a view for illustrating operations of a steering lock unit of the first embodiment.

FIG. 4 illustrates operations of the steering lock unit 49. The steering lock unit 49 has a selector member 49a and a button 49b. The selector member 49a is rotatable from the LOCK position, through the ACC position and the ON position, to the ST (Start) position. Between the LOCK position and the ON position, there is only the ACC position, and there is no OFF position. The selector member 49a is movable between the LOCK position and the ACC position only while the button 49b is pushed. The selector member 49a is a movable component of the vehicle control main selector switch VCSW, and simultaneously a component of the ignition switch IGS. Furthermore, the selector member 49a is a component of the key request switch KRS. The key request switch KRS is switched on when the selector member 49a is pushed. The ignition switch IGS is operated by turning the selector member 49a.

At a step S201, the radio communication is performed when the driver pushes the selector member 49a to turn on the key request switch KRS. If the driver carries the card 21, the control system releases the button 49b. Therefore, the driver can turn the selector member 49a from the LOCK position to the ACC position by pushing the button 49b, as shown in a step S207. The steering lock unit 49 is resistant to being tampered by a child, as shown in a step S203, because it is necessary to push the selector member 49a and the button 49b in order to turn the selector 49a. If the driver does not have the card 21, the control system holds the button 49b immovable, and produces the card warning signal, as shown in a step S205. Therefore, the driver cannot push the button 49b, and cannot turn the selector member 49a.

The selector member 49a is freely movable between the ACC position and the ST position. Therefore, the driver can start the engine of the vehicle by turning the selector member 49a from the ACC position to the ST position, as shown in a step S209. The select member 49a automatically returns to the ON position, as shown in a step S211, after the engine starting operation.

At a step S213, the control system ascertains the existence of the card 21 in the predetermined safe area each time any one of the doors is brought from the open state to the closed state. If the driver does not have the card 21 in the vehicle, then the control system produces the card warning signal to warn that the card 21 is missing, as shown in a step S215.

The driver can stop the engine by turning the selector member 49a from the ON position to the ACC position, as shown in a step S217. The selector member 49a is freely movable between the ST position and the ACC position. If the driver's door is opened while the selector member 49a is in the ACC position, then the control system produces the steering lock warning signal to warn the steering lock is forgotten, as shown in a step S219.

In order to turn the selector member 49a from the ACC position to the LOCK position to lock the steering system, the driver must push the selector member 49a in the ACC position and further push the button 49b, as shown in steps S221 and S229. If the card 21 is missing in the key operating area, the button 49b remains incapable of being pushed, so that the selector member 49a is incapable of being turned to the LOCK position, and the card warning signal is produced, as shown in a step S223. When the shift lever of the automatic transmission is out of the parking position, or the vehicle speed is greater than zero, then the button 49b is not released, as shown in a step S225 and S227. Therefore, the driver can turn the selector member 49a to the LOCK position only when the card 21 exists in the predetermed area, and the vehicle is at rest. When the vehicle is equipped with a manual transmission, it is necessary to omit the step S225 from FIG. 4, and the step S105 from FIG. 3A, and to employ only the vehicle speed check shown in the step S103 and S227. In the case of the automatic transmission, it is optional to employ only one of the vehicle speed check of the step S103 and the parking range check of the step S105.

The vehicle control main selector switch VCSW of this example has only the LOCK position for locking the steering system, the ACC position for turning on the elecric accessories such as an air conditioning system and a sound system, the ON position for the normal vehicle operation, and the ST position for starting the engine. Unlike the conventional ignition switch, the vehicle control main selector switch VCSW of this example has no OFF position. Therefore, when the vehicle control selector switch VCSW is out of the LOCK position, the accessories are always operative, so that the driver can readily notice the selector switch VCS being out of the LOCK position.

A second embodiment of the present invention is shown in FIGS. 5-8C. A keyless lock control system of the second embodiment is designed to calculate a distance between a keyless entry card 21 and an antenna by using a propagation time of radio waves.

Figure 5:
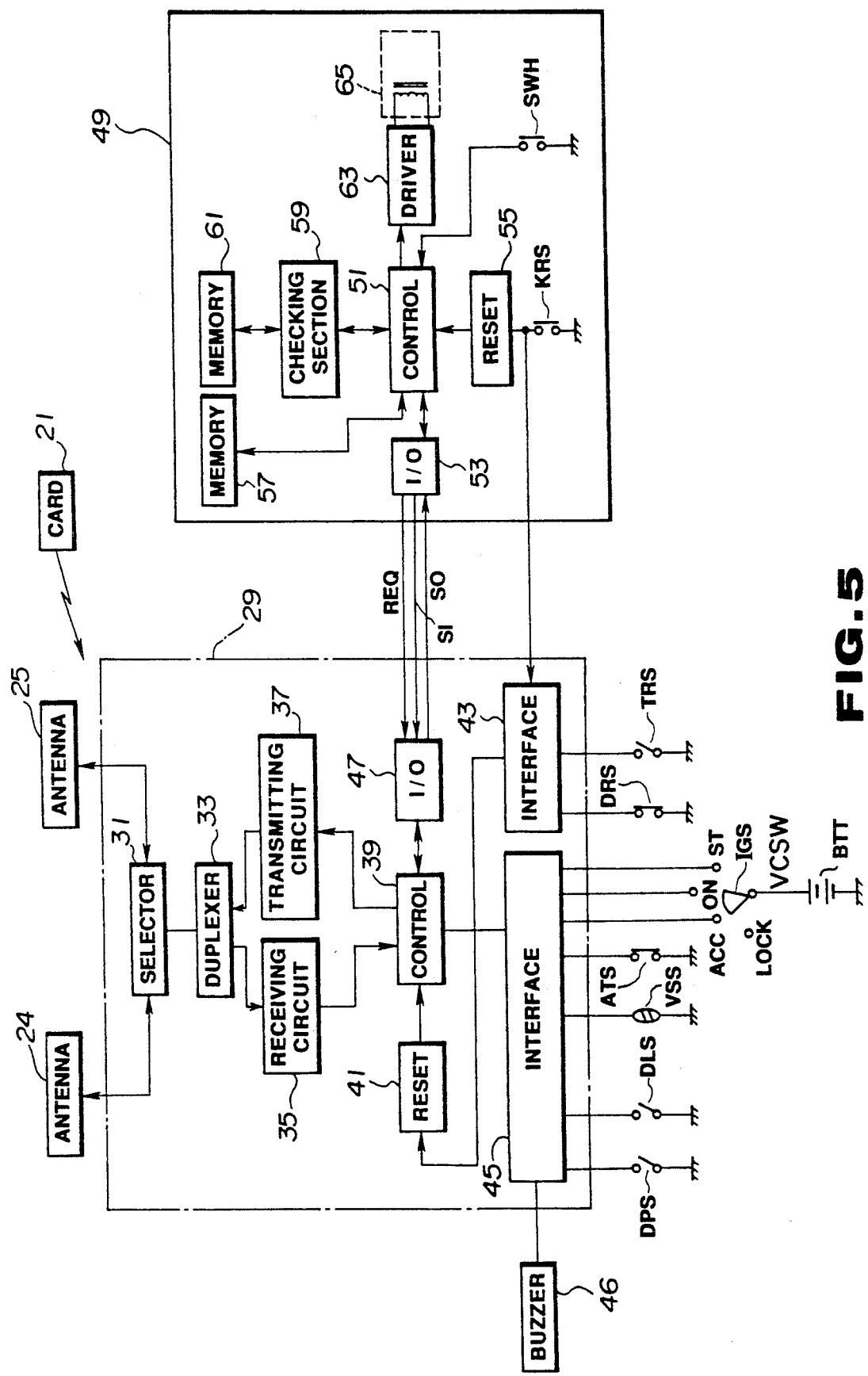
FIG. 5 is a block diagram showing a keyless lock system according to a second embodiment of the present invention.

As shown in FIG. 5, the keyless lock control system of the second embodiment is almost the same as the keyless lock control system of the first embodiment, but different in the following points.

The keyless lock control system of the second embodiment has only two antennas, a center antenna 24 and a trunk control antenna 25. The trunk antenna 25 is provided in the rear bumper, as in the first embodiment. The center antenna 24 is disposed at a central portion 13 of the vehicle shown in FIG. 6. The keyless lock control system of the second embodiment employs a microwave system utilizing microwaves, and the card 21 is capable of transmitting microwaves.

The control section 39 of the control unit 29 is designed to measure a propagation time (or propagation delay) of microwaves received by the center antenna 24, to calculate a distance between the card 21 and the center antenna 24 by using the propagation time, and to determine the position of the card 21. The control section 39 serves as a measuring means for measuring the propagation time, and as a calculating means for calculating the distance between the card 21 and the center antenna 24. The control section 39 comprises a comparing means for comparing the calculated distance between the card 21 and the center antenna 24, with a predetermined first value. The control section 39 judges the card 21 to be present in a predetermined inside area AB shown in FIG. 6 if the calculated distance is equal to or smaller than the predetermined first value. If the calculated distance is greater than the predetermined first value, the control section 39 judges the card 21 to be present in a predetermined outside area AA shown in FIG. 6. It is possible to further provide a second comparing means for comparing the calculated distance with a predetermined second value which is greater than the first value. In this case, the control section 39 judges the card 21 to exist in the outside area when the calculated distance is greater than the first value, and smaller than the second value. The control section 39 sends a signal indicative of the judgement to the steering lock unit 49.

Figures 6, 7:
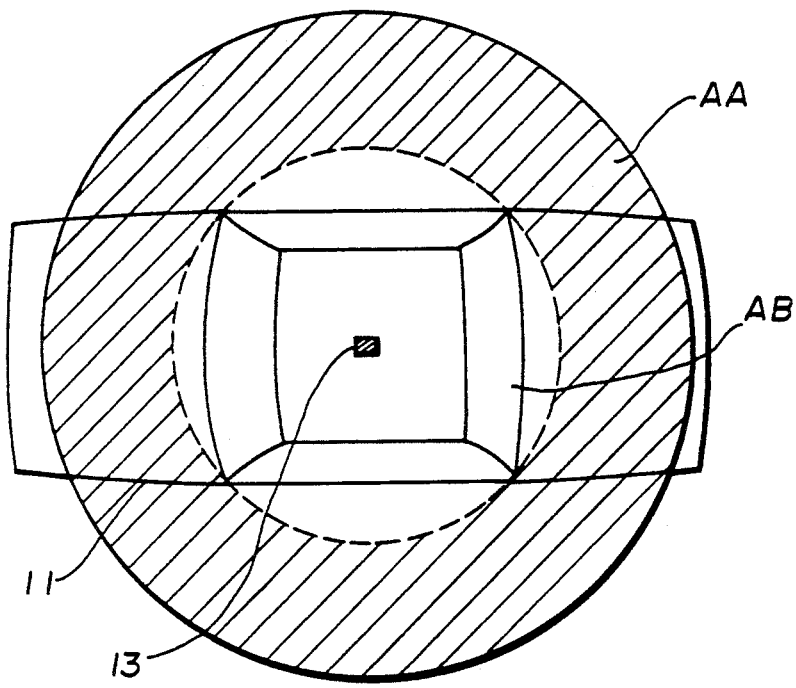
FIG. 6 is a view showing an inside area and an outside area of a vehicle, between which the keyless lock system of the second embodiment is arranged to discriminate.
FIG. 7 is a table for illustrating door lock control operations and steering lock control operations performed by the keyless lock system of the second embodiment.

FIG. 7 illustrates operations of the keyless lock control system of the second embodiment.

When the vehicle control main selector switch VCSW is in the ACC position: In this case, the control system of the second embodiment allows a keyless unlock operation of a controlled door only when the controlled door is in the locked state, and the card 21 is present in the outside area AA. If the door is in the unlocked state, then the door lock control is inoperative irrespective of the position of the card 21. The control system allows a keyless steering unlock operation only when the card 21 is present in the inside area AB.

When the vehicle control main selector switch VCSW is in the LOCK position (or in the OFF position), that is when the ignition system and the accessory system are both in the off state: In this case, the control system allows a keyless door unlock operation only when the door is in the locked state and the card 21 is present in the outside area AA. Therefore, an unauthorized person cannot enter the vehicle even if the card 21 is left in the passenger compartment. The control system allows the keyless door lock operation only when the door is unlocked and the card 21 is present in the outside area AA. Furthermore, the control system allows the keyless steering unlock operation only when the card 21 is present in the inside area AB.

Figure 8A:
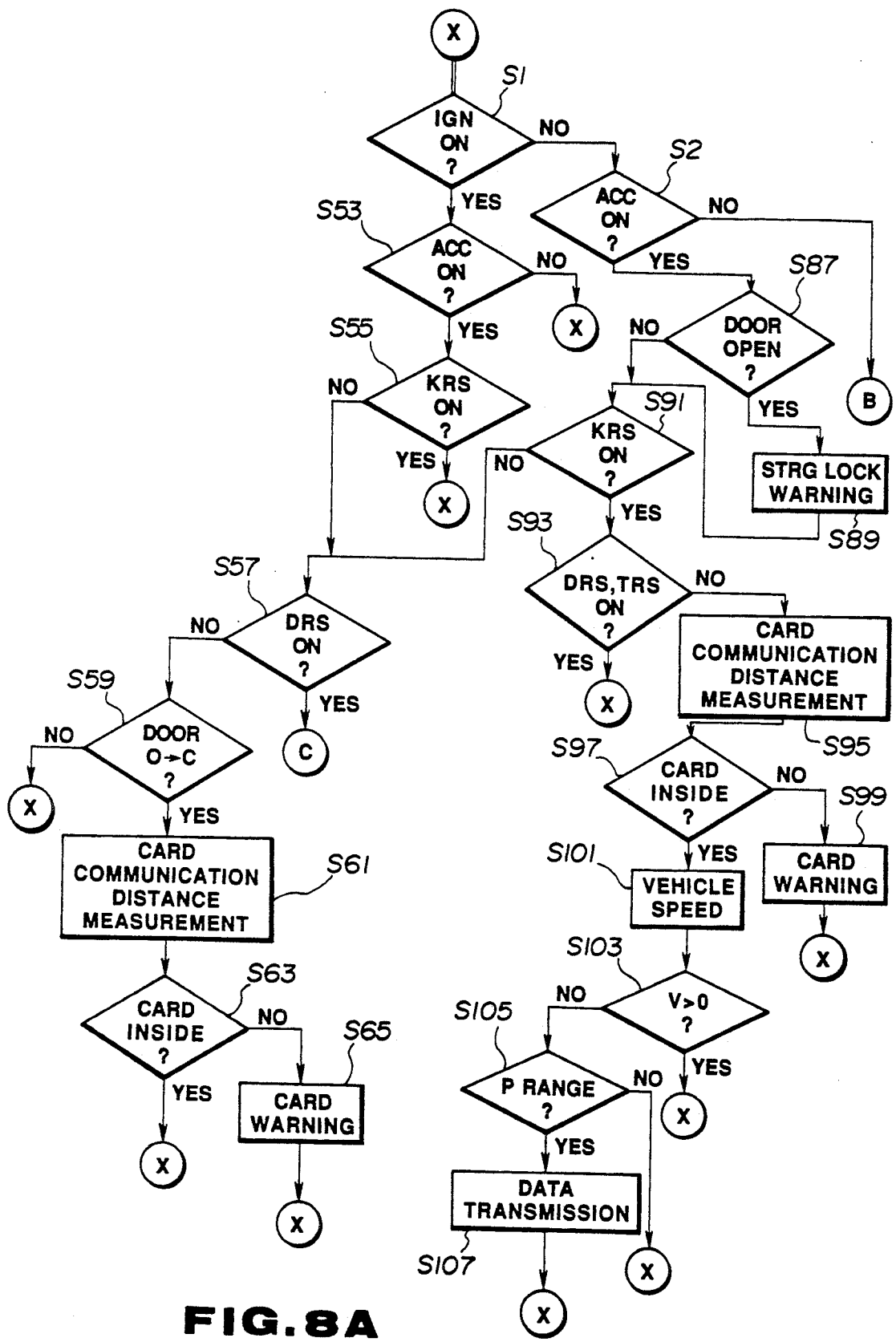
FIGS. 8A, 8B and 8C are flowcharts showing a control procedure performed by the keyless lock control system of the second embodiment.
Figure 8B:
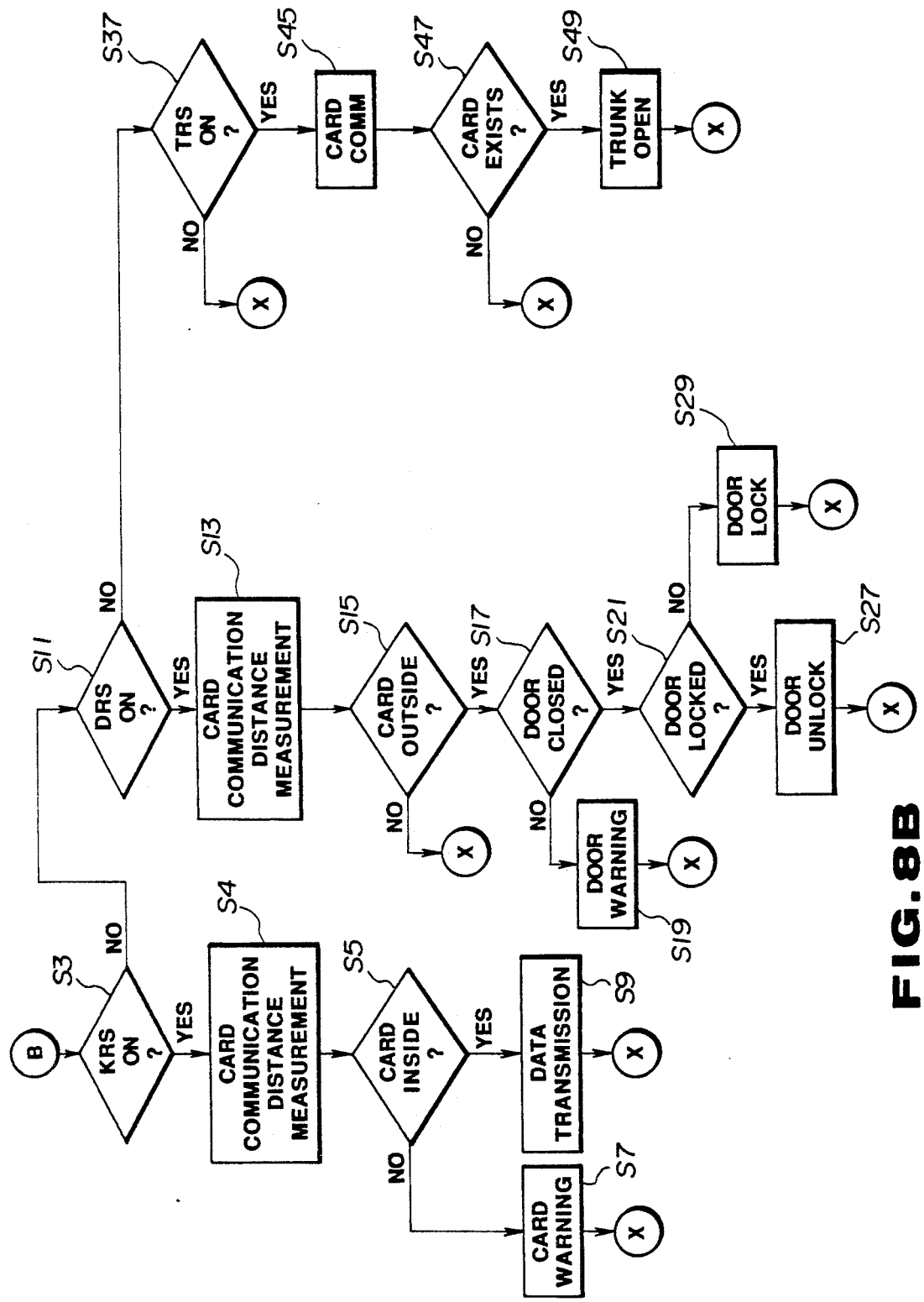
Figure 8C:
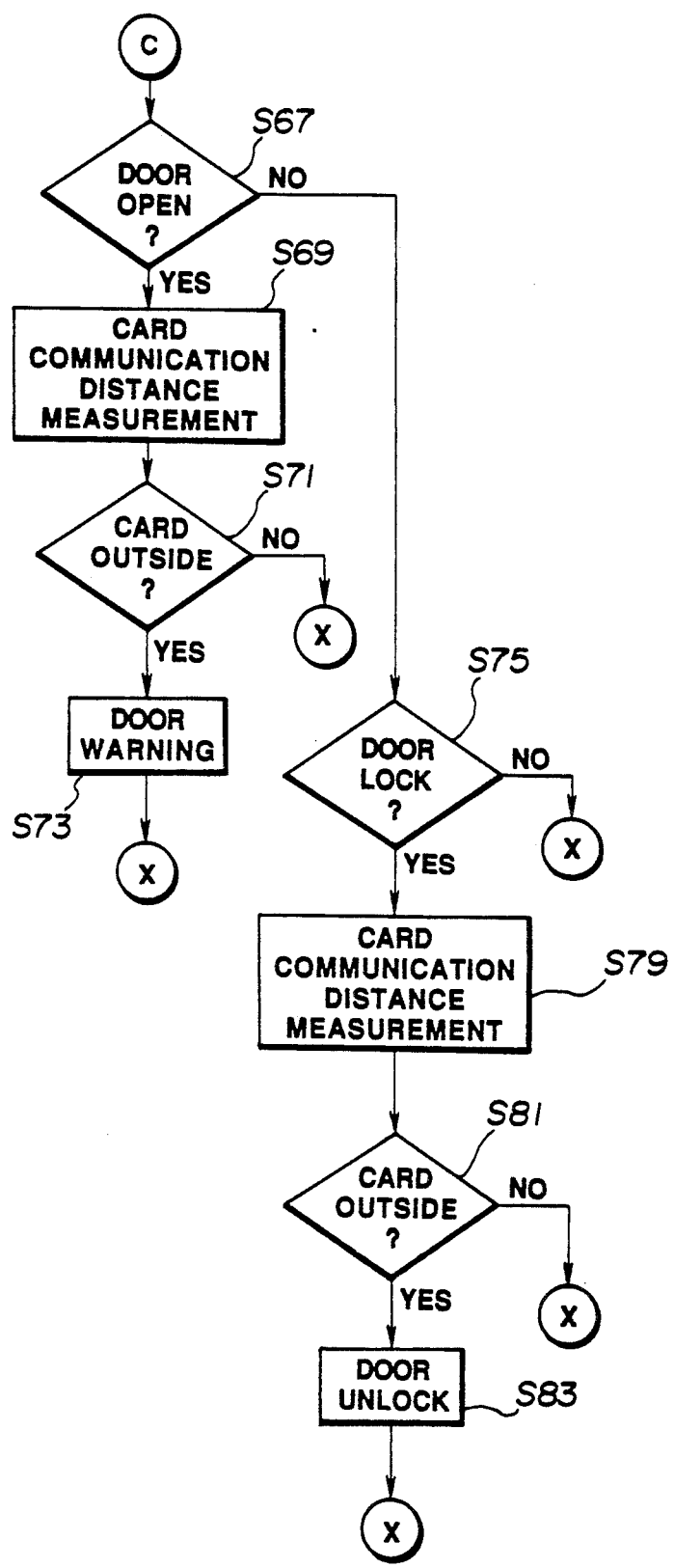

The control procedure of the second embodiment shown in FIGS. 8A, 8B and 8C is almost the same as the control procedure of the first embodiment shown in FIGS. 3A, 3B and 3C. In the second embodiment, the steps S61, S63, S69, S71, S79, S81, S95, S97, S4, S5, S13 and S15 are modified, and the steps S23, S25, S31, S33, S35, S39, S41 and S43 are omitted.

At the step S61, the control system of the second embodiment performs microwave communication, and calculates the distance between the card 21 and the center antenna 24 by using the propagation time of the microwave signal transmitted from the card 21. At the step S63, the control system of the second embodiment determines whether the card 21 exists in the inside area AB, or not. If the card 21 is present in the inside area AB, then the control system returns to the step S1 through the connector point X. If the card 21 is absent in the inside area AB, then the control system proceeds to the step S65 to produce the card warning signal.

At each of the steps S69, S79, S95, S4 and S13, the control system of the second embodiment performs microwave communication with the card 21 and calculates the distance between the card 21 and the center antenna 24, as in the step S61.

At the step S71 shown in FIG. 8C, the control system determines, by using the distance obtained at the step S69, whether the card 21 exists in the outside area AA, or not. Then, the control system proceeds from the step S71 to the step S73 to produce the door warning signal only when the card 21 is present in the outside area AA.

At the step S81, the control system determines, by using the distance obtained at the step S79, whether the card 21 exists in the outside area AA, or not. Then, the control system proceeds from the step S81 to the step S83 to unlock the door only when the card 21 is present in the outside area AA.

At the step S5 shown in FIG. 8B, the control system determines, by using the distance obtained at the step S4, whether the card 21 exists in the inside area AB, or not. Then, the control system produces the card warning signal at the step S7 if the card 21 is not present in the inside area AB, and proceeds to the step S9 if the card 21 is present in the inside area AB.

At the step S15, the control system determines, by using the distance obtained at the step S13, whether the card 21 exists in the outside area AA. Then, the control system returns to the step S1 if the card 21 is not present in the ouside area AA, and proceeds to the step S17 if the card 21 exists in the outside area AA.

At the step S97 shown in FIG. 8A, the control system determines, by using the distance obtained at the step S95, whether the card 21 exists in the inside area AB, or not. Then, the control system produces the card warning signal at the step S99 if the card 21 is not present in the inside area, and proceeds to the step S101 if the card 21 is present in the inside area AB.

The keyless lock system of the second embodiment employs only the center antenna 24 instead of the door control antenna 23 and the ignition control antenna 27. Therefore, the system of the second embodiment is advantageous in cost reduction. However, it is optional to provide two center antennas at appropriate positions in the vehicle in order to further improve the accuracy in detecting the position of the card 21.

The keyless lock control system of the second embodiment can detect the position of the card 21 in a speedy and accurate manner, as compared with the conventional system which is arranged to detect the position of the card by monitoring the variation of the signal level of the signal received from the card. The conventional system is susceptible to noises of electromagnetic waves, and slow in detecting the position of the card.

What is claimed is:

1. A keyless lock system for a vehicle, comprising:
    a portable communicating means for transmitting a code signal;
    an onboard communicating means for receiving said code signal from said portable communicating means;
    a primary means for sensing a position of a monitored door of the vehicle to determine whether the door is in a closed state or in an open state;
    a final means for producing a first warning signal in response to a first alarm command signal; and
    a controlling means for producing an automatic request signal when the door is moved between the open state and the closed state, ascertaining an existence of said portable communicating means by receiving said code signal through said onboard communicating means when said automatic request signal is produced, and producing said first alarm command signal if said portable communicating means is absent.

2. A keyless lock system according to claim 1 wherein said final means comprises an actuating means for bringing a lock unit of the vehicle to an actuated position in response to an actuation command signal and a warning means for producing said first warning signal, and said controlling means produces said actuation command signal if said portable communicating means is present.

3. A keyless lock system according to claim 2 wherein said controlling means is connected with said onboard communicating means, said primary means, and said final means, and said controlling means comprises a condition discriminating means for producing said automatic request signal when the door is moved from the open state to the closed state, and an examining means which, upon receipt of said automatic request signal, performs an examination to ascertain the existence of said portable communicating means, and which produces said alarm command signal in response to said first alarm command signal only when said portable communicating means is absent.

4. A keyless lock system according to claim 3 wherein said portable communicating means comprises a pocket device for radiating radio waves, said onboard communicating means comprises a first onboard antenna, mounted on the vehicle, for receiving radio waves from said pocket device, and said examining means includes a means for initiating the examination upon receipt of said automatic request signal and affirms the existence of said portable means only when said portable means is detected in a predetermined area near said first antenna by said onboard communicating means.

5. A keyless lock system according to claim 4 wherein said actuating means comprises a first lock actuator for putting a first lock unit for protecting the vehicle in a first lock position in response to a first lock command signal and in a first unlock position in response to a first unlock command signal, said primary means comprises a door position sensing means for detecting the open and closed states of the door, and a first request switch, said discriminating means comprises a first door condition discriminating means for producing said automatic request signal each time the door is closed, and a first switch condition discriminating means for producing a first switch request signal when said first request switch is switched to a first request position, and said examining means comprises an automatic request examining means which, upon receipt of said automatic request signal, determines whether said portable means is in a predetermined safe area within the vehicle, and produces said alarm command signal in response to said automatic request signal if said portable means is absent in said safe area, and a first switch request examining means which, upon receipt of said first switch request signal, determines whether said portable means is in a predetermined first operating area, and produces said first unlock command signal in response to said first switch request signal if said portable means is present in said first operating area.

6. A keyless lock system according to claim 5 wherein said primary means further comprises a vehicle control switch movable between a vehicle lock state for preventing operation of the vehicle, and a vehicle unlock state for allowing operation of the vehicle, and said first lock actuator is so arranged that said first lock actuator can prevent movement of said vehicle control switch between the vehicle lock state and the vehicle unlock state in response to the first lock command signal and allow movement of said vehicle control switch between the vehicle lock state and the vehicle unlock state in response to the first unlock command signal.

7. A keyless lock system according to claim 6 wherein said controlling means further comprises a second door condition discriminating means for producing an alarm request signal and for sending said alarm request signal to said warning means to cause said warning means to produce a second warning signal when said vehicle control switch is in the vehicle unlock state and simultaneously a controlled door of the vehicle is in the open state, said controlled door being one door of a set of doors of the vehicle which comprises said monitored door of the vehicle.

8. A keyless lock system according to claim 7 wherein said vehicle control switch is a multiposition selector switch for selecting one of switch positions consisting of a vehicle lock position for turning off an electrical accessory system of the vehicle, an accessory position for turning on the accessory system, an ignition on position for turning on an ignition system for an engine of the vehicle and a start position for starting the engine, said vehicle control switch having only the accessory position between the vehicle lock position and the ignition on position, said vehicle control switch being in the vehicle lock state when said vehicle control switch is in the vehicle lock position, and in the vehicle unlock state when the vehicle control switch is out of the vehicle lock position.

9. A keyless lock system according to claim 8 wherein said second door condition discriminating means includes a means for producing said alarm request signal only when said vehicle control switch is in the accessory position.

10. A keyless lock system according to claim 7 wherein said actuating means further comprises a second lock actuator for putting a second lock unit of the vehicle in a second lock position in response to a second lock command signal and in a second unlock position in response to a second unlock command signal, said primary means further comprises a second request switch, and said controlling means further comprises a second switch condition discriminating means for producing a second switch request signal when said second request switch is switched to a second request position, and a second switch request examining means which, upon receipt of said second switch request signal, determines whether said portable communicating means is in a predetermined second operating area, and produces said second unlock command signal if said portable communicating means is in said second operating area.

11. A keyless lock system according to claim 10 wherein said second lock unit is a device for locking and unlocking the controlled door of the vehicle, and said door position sensing means comprises a first door position switch for sensing the position of the monitored door of the vehicle, and a second door position switch for sensing the position of the controlled door of the vehicle which is distinct from the monitored door of the vehicle.

12. A keyless lock system according to claim 11 wherein said primary means comprises a door lock sensing means for sensing a position of said second lock unit of the vehicle, said second switch condition discriminating means includes a means for producing said second switch request signal only when said vehicle control switch is in the vehicle lock state, said second switch request examining means includes a means for producing said second unlock command signal when the controlled door of the vehicle is locked and producing said second lock command signal in response to said second switch request signal when said portable communicating means is detected in said second operating area and simultaneously the controlled door of the vehicle is unlocked, and said controlling means further comprises a third switch condition discriminating means for producing said second switch request signal only when the controlled door of the vehicle is locked, said second request switch is switched to the second request position and said vehicle control switch is in the vehicle unlock position.

13. A keyless lock system according to claim 12 wherein said primary means further comprises a vehicle state sensing means for sensing a rest state of the vehicle, said first switch condition discriminating means comprises a means for producing a first unlock request signal when said first request switch is switched to the first request position while said vehicle control switch is in the vehicle lock position, and a means for producing a first lock request signal when said first request switch is switched to the first request position while said vehicle control switch is in the accessory position, and said first switch request examining means comprises a means for producing said first unlock command signal in response to the first unlock request signal if said portable communicating means is present in said first operating area, and a means for producing said first lock command signal in response to said first lock request signal if said portable communicating means is present in said first operating area and simultaneously the vehicle is in the rest state, and wherein said vehicle control switch locks a steering system of the vehicle when said vehicle control switch is in said vehicle lock state.

14. A keyless lock system according to claim 13 wherein said vehicle state sensing means comprises a vehicle speed sensor for sensing a vehicle speed of the vehicle to detect the rest state of the vehicle.

15. A keyless lock system according to claim 13 wherein said vehicle state sensing means comprises an automatic transmission position sensor for detecting a condition of an automatic transmission of the vehicle to determine whether the automatic transmission is in a parking range.

16. A keyless lock system according to claim 2 wherein said portable communicating means includes a means for radiating microwaves, said onboard communicating means includes a means for receiving microwaves from said portable means, and said controlling means comprises an examining means for calculating a distance between said portable communicating means and said onboard communicating means by using a microwave propagation time, and determining in accordance with said distance whether said portable communicating means is present or absent in a predetermined area.

17. A keyless lock system according to claim 16 wherein said portable communicating means comprises a pocket device for radiating microwaves, said onboard communicating means includes a means for receiving microwaves from said pocket device, and said examining means includes a means for measuring said microwave propagation time which is a time interval required for a microwave signal to travel between said pocket device and said onboard communicating means, calculating said distance between said pocket device and said onboard communicating means, and producing said alarm command first value.

18. A keyless lock system according to claim 2 wherein said primary means comprises a vehicle control switch which is movable between a vehicle lock state for preventing operation of the vehicle and a vehicle unlock state for allowing operation of the vehicle, and said controlling means is connected with said vehicle control switch, said controlling means including a means for producing said automatic request signal when the monitored door of the vehicle is moved between the open state and the closed state while said vehicle control switch is in said vehicle unlock state.

19. A keyless lock system according to claim 18 wherein said actuating means includes a means for allowing movement of said vehicle control switch between the vehicle lock state and the vehicle unlock state in response to a first unlock command signal, and preventing movement of said vehicle control switch between the vehicle lock state and vehicle unlock state when the first unlock command signal is absent, and said controlling means includes a means for producing said first unlock command signal only when said portable communicating means is present.

20. A keyless lock system according to claim 19 wherein said vehicle control switch is a multiposition selector switch for selecting one of a plurality of switch positions including: a vehicle lock position for turning off an electrical accessory system of the vehicle, an accessory position for turning on the accessory system, and an ignition on position for turning on an ignition system for an engine of the vehicle, said vehicle control switch being in the vehicle lock state when said vehicle control switch is in the vehicle lock position, and in the vehicle unlock state when the vehicle control switch is out of the vehicle lock position, and wherein said actuating means comprises a first lock actuator for putting a first lock unit in a first lock position in response to a first lock command signal and in a first unlock position in response to said first unlock command signal, said first lock unit preventing both a switching-on operation of said vehicle control switch from the vehicle lock state to the vehicle unlock state, and a switching-off operation of said vehicle control switch from the vehicle unlock state to the vehicle lock state when said first lock unit is in said first lock position.

21. A keyless lock system for a vehicle, comprising:
a portable communicating means for transmitting microwaves;
an onboard communicating means for receiving microwaves from said portable communicating means;
an actuating means for actuating a lock unit of the vehicle in response to an actuation command signal; and
a controlling means for calculating a distance between said portable communicating means and said onboard communicating means by using a microwave propagation time, determining, in dependence on said distance, whether said portable communicating means is in a predetermined area or not, and producing said actuation command signal only when said portable communicating means is in said predetermined area.

22. A keyless lock system according to claim 21 wherein said controlling means comprises an examining means for measuring said microwave propagation time which is a time interval required for a microwave signal to travel between said portable communicating means and said onboard communicating means, calculating said distance between said portable means and said onboard means, and determining in accordance with said distance whether said portable means is present in said predetermined area.

* * * * *